United States Patent
Donderici

(10) Patent No.: US 10,627,541 B2
(45) Date of Patent: Apr. 21, 2020

(54) SYSTEM, METHOD AND COMPUTER-PROGRAM PRODUCT FOR IN-SITU CALIBRATION OF A WELLBORE RESISTIVITY LOGGING TOOL

(71) Applicant: HALLIBURTON ENERGY SERVICES, INC., Houston, TX (US)

(72) Inventor: Burkay Donderici, Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

(21) Appl. No.: 16/540,571

(22) Filed: Aug. 14, 2019

(65) Prior Publication Data

US 2019/0369289 A1 Dec. 5, 2019

Related U.S. Application Data

(62) Division of application No. 14/427,174, filed as application No. PCT/US2013/052361 on Jul. 26, 2013, now Pat. No. 10,444,404.

(51) Int. Cl.
*G01V 13/00* (2006.01)
*G01V 3/28* (2006.01)
*G01V 3/26* (2006.01)
*E21B 7/04* (2006.01)

(52) U.S. Cl.
CPC ............. *G01V 13/00* (2013.01); *G01V 3/26* (2013.01); *G01V 3/28* (2013.01); *E21B 7/04* (2013.01)

(58) Field of Classification Search
CPC . G01V 13/00; G01V 3/26; G01V 3/28; G01V 3/30; G01V 3/38
See application file for complete search history.

(56) References Cited

U.S. PATENT DOCUMENTS

| | | | |
|---|---|---|---|
| 5,001,675 A | 3/1991 | Woodward | |
| 5,774,360 A | 6/1998 | Xiao et al. | |
| 7,171,310 B2 | 1/2007 | Haugland | |
| 7,209,834 B2 | 4/2007 | El Askary | |
| 7,598,741 B2 | 10/2009 | Fanini et al. | |
| 2004/0073371 A1 | 4/2004 | Haugland | |
| 2008/0197851 A9 | 8/2008 | Forgang et al. | |
| 2011/0037474 A1* | 2/2011 | Dashevsky | G01N 33/24 324/354 |
| 2011/0144960 A1* | 6/2011 | Weng | E21B 44/00 703/2 |

(Continued)

FOREIGN PATENT DOCUMENTS

| | | |
|---|---|---|
| CN | 1274426 A | 11/2000 |
| CN | 102562047 A | 7/2012 |
| RU | 2401442 C2 | 10/2010 |

OTHER PUBLICATIONS

Chong, et al., "Resistivity Correction Method for Bilateral Logging Under the Condition of Saline Solution Mud Fluid Intrusion in Mahe Gas Field," *Oil Geophysical Prospecting*, Oct. 2010, vol. 45, No. 5, pp. 757-763.

(Continued)

*Primary Examiner* — Son T Le
*Assistant Examiner* — Dustin R Dickinson

(57) ABSTRACT

In-situ calibration of a resistivity logging tool is accomplished using a variety of methods in which deep measurement signals are calibrated using acquired and simulated measurement signals.

25 Claims, 13 Drawing Sheets

(56) References Cited

U.S. PATENT DOCUMENTS

2012/0078558 A1   3/2012  Pelegri et al.
2016/0145990 A1*  5/2016  Mace .................... E21B 43/263
                                                 166/299

OTHER PUBLICATIONS

International Search Report and the Written Opinion of the International Searching Authority, or the Declaration, Jan. 7, 2014, PCT/US2013/052361, 12 pages, International Searching Authority, US.

Netto, et al., "Landing a Well Without a Pilot Well Using the New Deep Electromagnetic Direction LWD Tool", Rio Oil & Gas Expo and Conference, Sep. 2012, Brazilian Petroleum, Gas and Biofuels Institute.

Office Action issued for Chinese Patent Appl. No. 2013800774044 dated Nov. 30, 2016, 6 pages.

Office Action issued for Norwegian Patent Appl. No. 20151778, dated Dec. 17, 2018, 7 pages. (with translation).

Office Action with Search Report for Russian Patent Appl. No. 2015153196, dated May 29, 2017.

Search Report issued for Chinese Patent Appl. No. 2013800774044 dated Nov. 25, 2016, 2 pages.

* cited by examiner

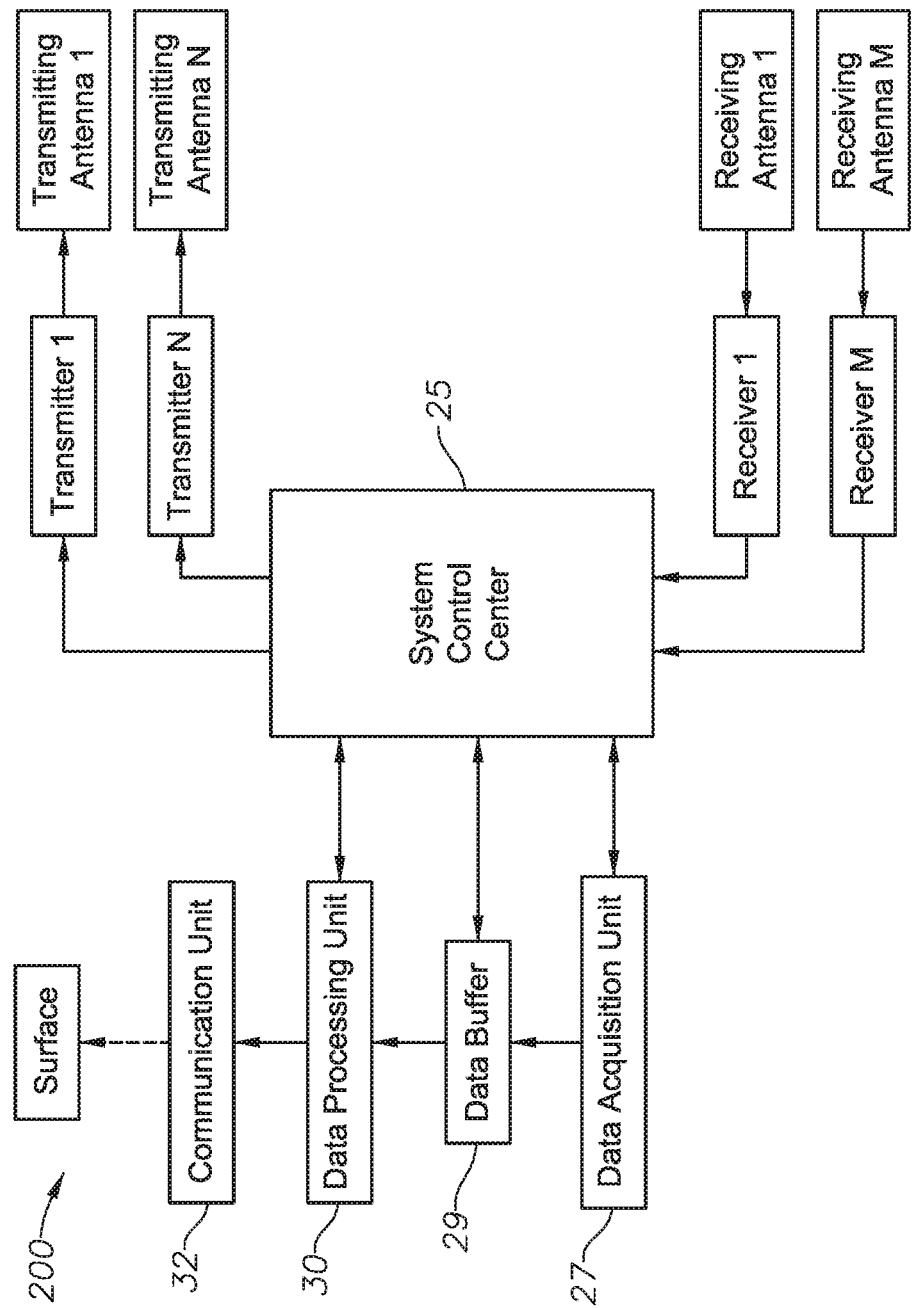

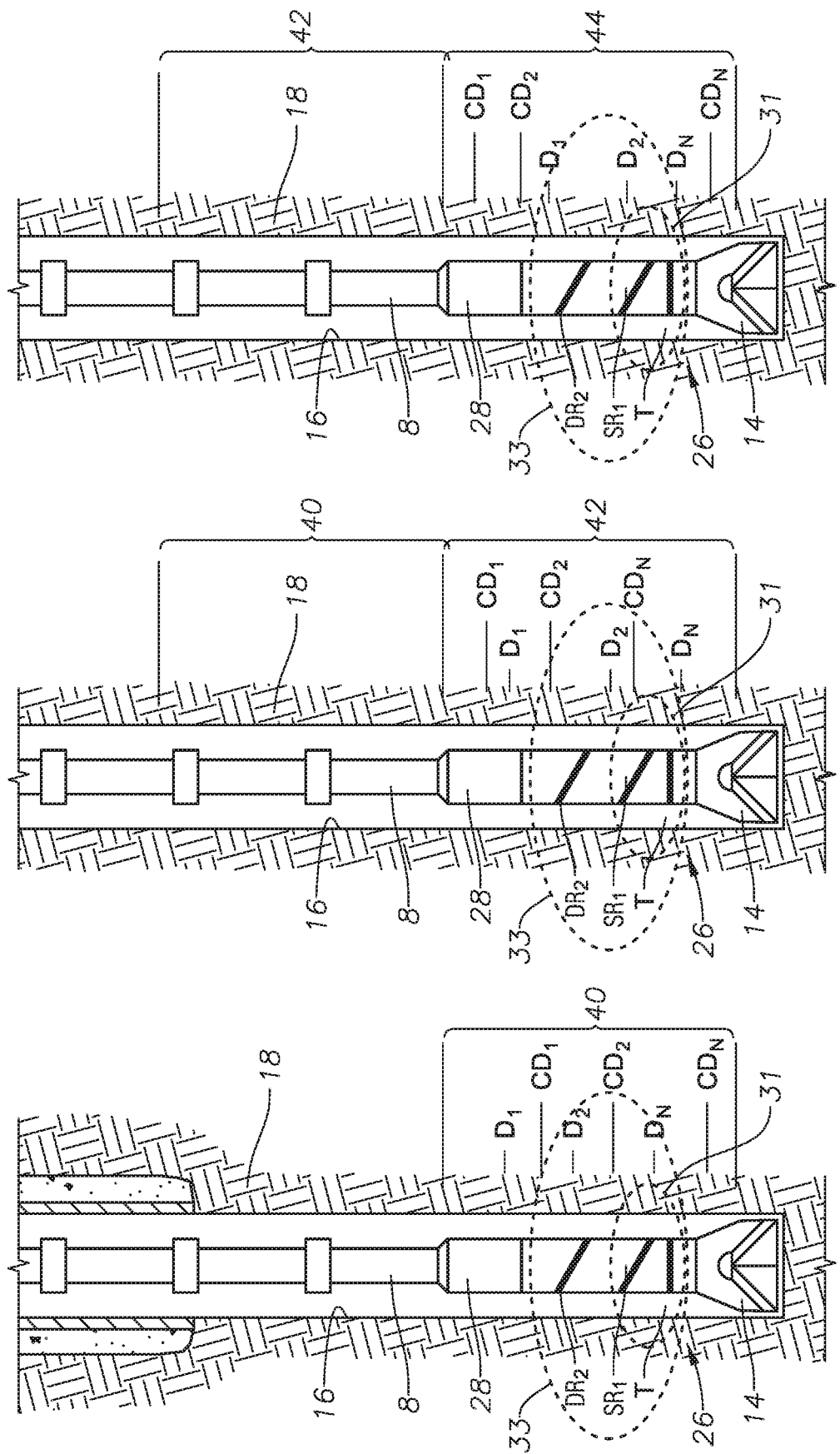

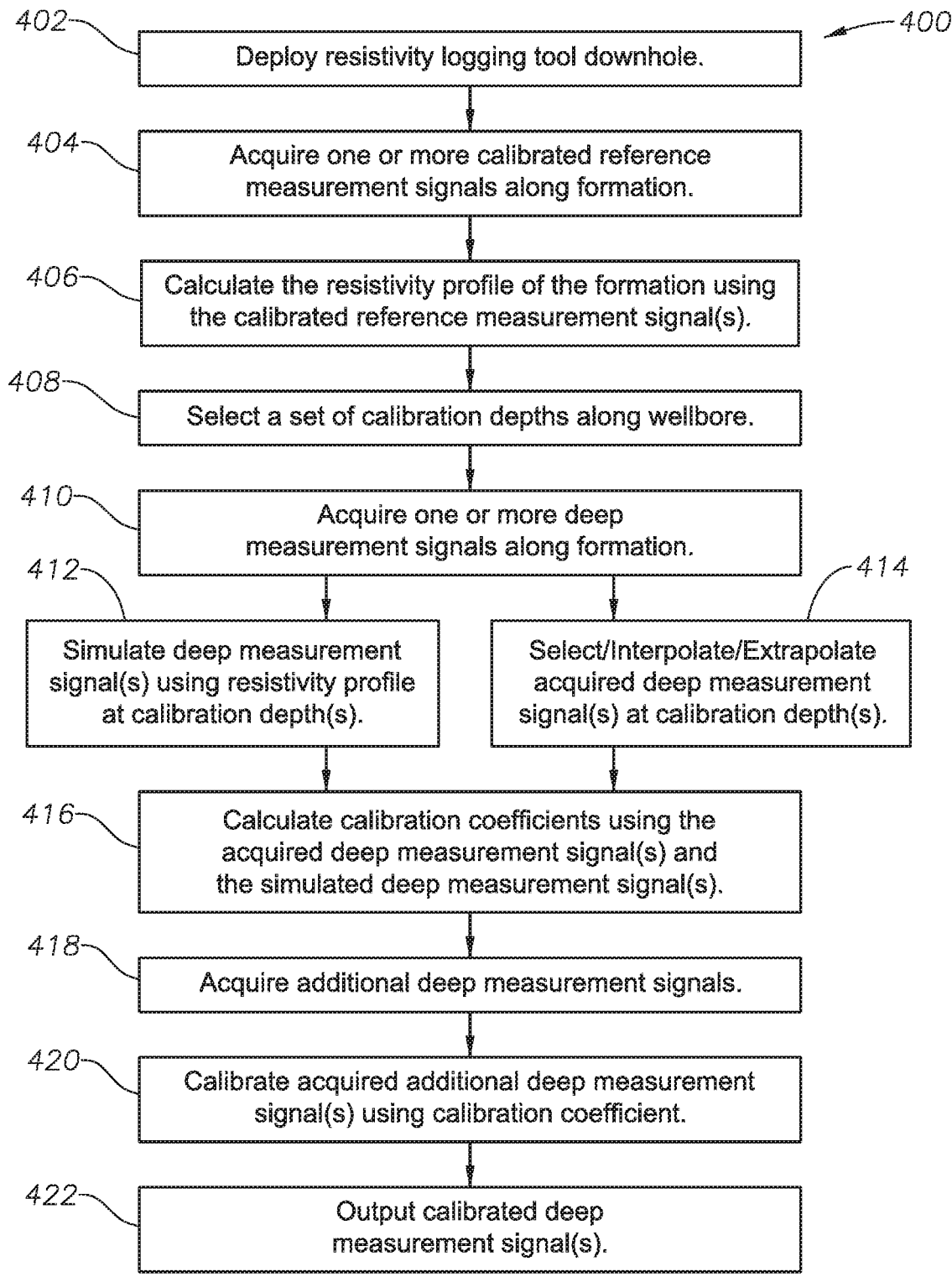

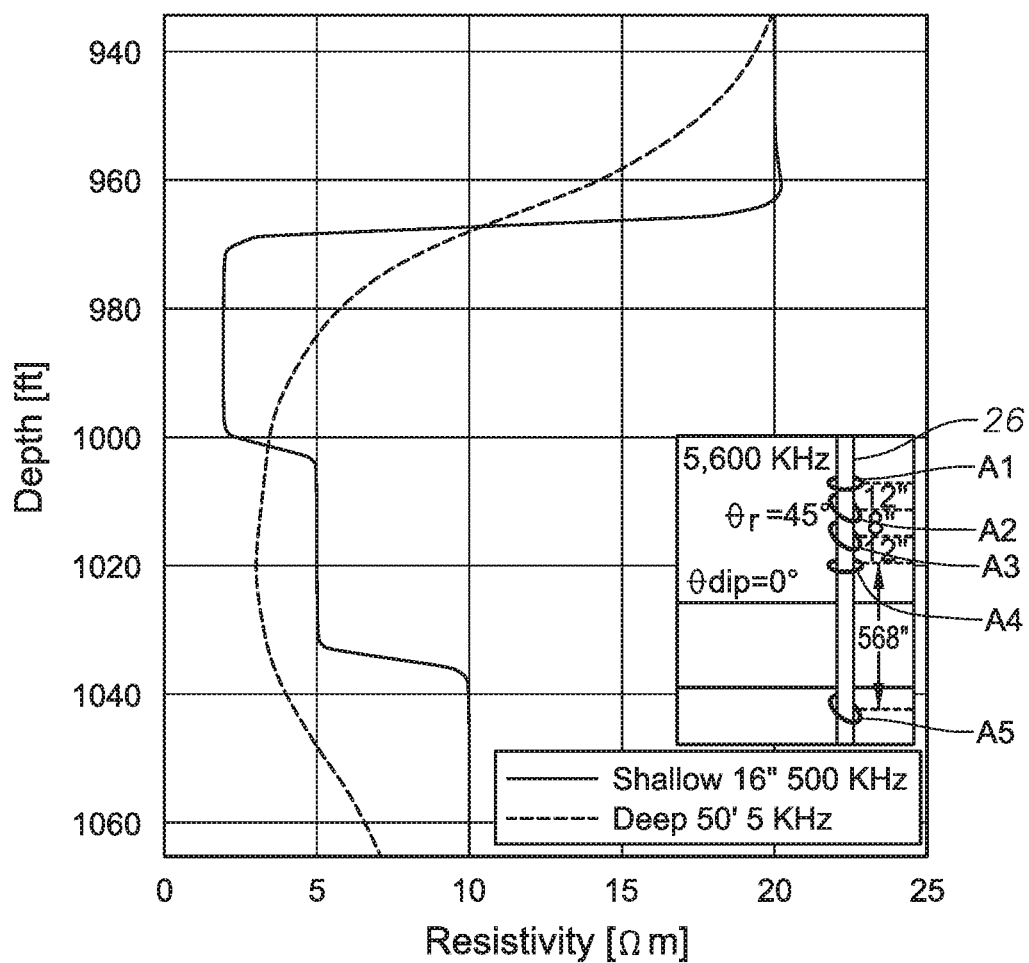

SYSTEM, METHOD AND COMPUTER-PROGRAM PRODUCT FOR IN-SITU CALIBRATION OF A WELLBORE RESISTIVITY LOGGING TOOL

CROSS-REFERENCE TO RELATED APPLICATIONS

The present application is a continuation application of U.S. patent application Ser. No. 14/427,174, filed on Mar. 10, 2015, which is a U.S. National Stage patent application of International Patent Application No. PCT/US2013/052361, filed on Jul. 26, 2013, the benefit of which is claimed and the disclosures of which are incorporated herein by reference in their entirety.

FIELD OF THE DISCLOSURE

The present disclosure relates generally to calibration techniques for wellbore logging tools and, more specifically, to an in-situ calibration method for a resistivity logging tool.

BACKGROUND

Among all logging tools deployed in the wellbore, resistivity tools provide the largest depth of detection. As a result, they have been extensively used for detecting formation layer boundaries in applications such as landing or well placement. Moreover, such logging tools are utilized to acquire various other characteristics of earth formations traversed by the wellbore and data relating to the size and configuration of the wellbore itself. The collection of information relating to downhole conditions, commonly referred to as "logging," can be performed by several methods including wireline logging, "logging while drilling" ("LWD") and "measuring while drilling ("MWD").

The depth of detection provided by the logging tool is directly proportional to the distance between the transmitter and the receiver. As a result, most of the deep reading tools have very large distance between them. For example, some deep resistivity reading tools can be as long as 50-100 feet, and they operate at frequencies lower than 8 KHz to compensate for the geometrically increasing attenuation at larger transmitter receiver separations. In contrast, the standard, shallower, tools have a range of about 20 feet and they are optimized for placement of wells in reservoirs within about 10 feet from the top or bottom boundary of the reservoir rock.

The required distances between the transmitters and receivers along deep reading tools create problems in calibration since most of the conventional calibration methods (air hang, test tank, or oven, for example) require a certain stand-off from any nearby objects that might interfere with the calibration measurement signals. As a result, it is impractical to apply these conventional calibration techniques to a deep reading resistivity tool since the tool's sensitive volume is too large and, thus, it is not feasible to have facilities big enough to fully contain the tools.

Accordingly, there is a need in the art for a practical technique in which to calibrate a deep reading resistivity logging tool.

BRIEF DESCRIPTION OF THE DRAWINGS

FIG. 2 is a block diagram of circuitry embodied within a logging tool necessary to acquire the formation measurement signals, according to certain illustrative embodiments of the present disclosure;

FIGS. 3B-3D illustrates a illustrative logging tool of the present disclosure deployed in one or more calibration and/or application zones along a wellbore;

FIG. 4 is a flow chart detailing an in-situ calibration method whereby an acquired deep measurement signal is calibrated using a modeled deep measurement signal, according to certain illustrative methodologies of the present disclosure;

FIG. 5A is a graph illustrating a modeled log response generated from look up tables, according to certain illustrative methodologies of the present disclosure;

DESCRIPTION OF ILLUSTRATIVE EMBODIMENTS

Illustrative embodiments and related methodologies of the present disclosure are described below as they might be employed in an in-situ calibration methodology for use with wellbore resistivity logging tools. In the interest of clarity, not all features of an actual implementation or methodology are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. Further aspects and advantages of the various embodiments and related methodologies of the disclosure will become apparent from consideration of the following description and drawings.

Figure 1A:
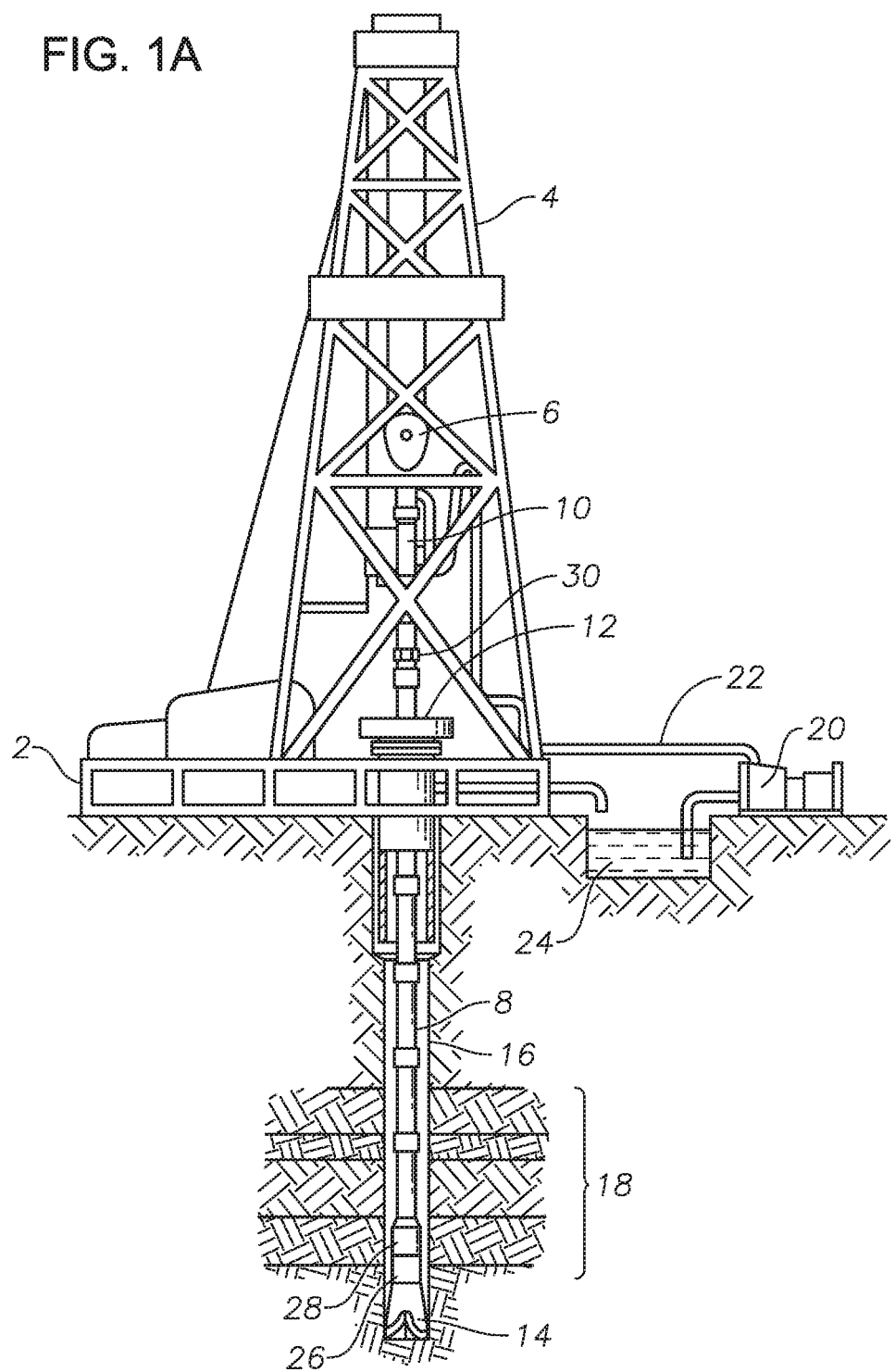
FIG. 1A illustrates an LWD logging tool that performs in-situ calibration of formation measurement signals taken along a hydrocarbon formation, according certain illustrative embodiments of the present disclosure.

FIG. 1A illustrates a resistivity logging tool, utilized in an LWD application, that performs in-situ calibration of measurement signals taken along a hydrocarbon formation, according certain illustrative embodiments. The methodologies described herein may be performed by a system control center located on the logging tool or may be conducted by a processing unit at a remote location, such as, for example, the surface. Nevertheless, illustrative embodiments of the in-situ calibration methodology are based on two formation measurement signals, one being a calibrated measurement signal and the other being an uncalibrated measurement signal. In a first illustrative methodology, by translating a shallow reference measurement signal into a deep measurement signal, the present inventive methodologies normalize the deep measurement signal with itself at selected calibration depths along the wellbore. In a second illustrative methodology, a deep low frequency measurement signal is utilized to calibrate the deep measurement signal. Thereafter, in either methodology, the calibrated deep measurement signal is inverted to generate desired petrophysical characteristics of the borehole and surrounding geological formation (i.e., formation parameters) related to electrical or geological properties of the formation such as, for example, layer resistivities, distances or direction to layer boundaries, 2D shape of arbitrary layer boundaries, or 3D distribution of formation resistivities. Accordingly, wellbore operations may be conducted based upon the formation parameters such as, for example, drilling, well placement, landing or geosteering operations.

FIG. 1A illustrates a drilling platform 2 equipped with a derrick 4 that supports a hoist 6 for raising and lowering a drill string 8. Hoist 6 suspends a top drive 10 suitable for rotating drill string 8 and lowering it through well head 12. Connected to the lower end of drill string 8 is a drill bit 14. As drill bit 14 rotates, it creates a wellbore 16 that passes through various layers of a formation 18. A pump 20 circulates drilling fluid through a supply pipe 22 to top drive 10, down through the interior of drill string 8, through orifices in drill bit 14, back to the surface via the annulus around drill string 8, and into a retention pit 24. The drilling fluid transports cuttings from the borehole into pit 24 and aids in maintaining the integrity of wellbore 16. Various materials can be used for drilling fluid, including, but not limited to, a salt-water based conductive mud.

A logging tool 26 is integrated into the bottom-hole assembly near the bit 14. In this illustrative embodiment, logging tool 26 is an LWD tool; however, in other illustrative embodiments, logging tool 26 may be utilized in a wireline or tubing-conveyed logging application. Logging tool 26 may be, for example, an ultra-deep reading resistivity tool. Alternatively, non-ultra-deep resistivity logging tools may also be utilized in the same drill string along with the deep reading logging tool. Persons ordinarily skilled in the art having the benefit of this disclosure will realize there are a variety of resistivity logging tools which may be utilized within the present disclosure. Moreover, in certain illustrative embodiments, logging tool 26 may be adapted to perform logging operations in both open and cased hole environments. Furthermore, in certain embodiments, the measurement signals utilized in the calibration process may have originated from different boreholes, preferably in the same region of earth where a strong relationship exists between the boreholes.

Still referring to FIG. 1A, as drill bit 14 extends wellbore 16 through formations 18, logging tool 26 collects measurement signals relating to various formation properties, as well as the tool orientation and various other drilling conditions. In certain embodiments, logging tool 26 may take the form of a drill collar, i.e., a thick-walled tubular that provides weight and rigidity to aid the drilling process. However, as described herein, logging tool 26 includes an induction or propagation resistivity tool to sense geology and resistivity of formations. A telemetry sub 28 may be included to transfer images and measurement data/signals to a surface receiver 30 and to receive commands from the surface. In some embodiments, telemetry sub 28 does not communicate with the surface, but rather stores logging data for later retrieval at the surface when the logging assembly is recovered.

Still referring to FIG. 1A, logging tool 26 includes a system control center ("SCC"), along with necessary processing/storage/communication circuitry, that is communicably coupled to one or more sensors (not shown) utilized to acquire formation measurement signals reflecting formation parameters. In certain embodiments, once the measurement signals are acquired, the system control center calibrates the measurement signals and communicates the data back uphole and/or to other assembly components via telemetry sub 28. In an alternate embodiment, the system control center may be located at a remote location away from logging tool 26, such as the surface or in a different borehole, and performs the processing accordingly. These and other variations within the present disclosure will be readily apparent to those ordinarily skilled in the art having the benefit of this disclosure.

The logging sensors utilized along logging tool 26 are resistivity sensors, such as, for example, magnetic or electric sensors, and may communicate in real-time. Illustrative magnetic sensors may include coil windings and solenoid windings that utilize induction phenomenon to sense conductivity of the earth formations. Illustrative electric sensors may include electrodes, linear wire antennas or toroidal antennas that utilize Ohm's law to perform the measurement. In addition, the sensors may be realizations of dipoles with an azimuthal moment direction and directionality, such as tilted coil antennas. In addition, the logging sensors may be adapted to perform logging operations in the up-hole or downhole directions. Telemetry sub 28 communicates with a remote location (surface, for example) using, for example, acoustic, pressure pulse, or electromagnetic methodologies, as will be understood by those ordinarily skilled in the art having the benefit of this disclosure.

As described above, logging tool 26 is, in this example, a deep sensing induction or propagation resistivity tool. As will be understood by those ordinarily skilled in the art having the benefit of this disclosure, such tools typically include one or more transmitter and receiver coils that are axially separated along the wellbore 16. The transmitter coils generate alternating displacement currents in the formation 18 that are a function of conductivity. The alternating currents generate voltage at the one or more receiver coils. In addition to the path through the formation 18, a direct path from the transmitter coil(s) to receiver coil(s) also exists. In induction tools, signal from such path can be eliminated by the use of an oppositely wound and axially offset "bucking" coil. In propagation tools, phase and amplitude of the complex-valued voltage can be measured at certain operating frequencies. In such tools, it is also possible to measure phase difference and amplitude ratio between of the complex-valued voltages at two axially spaced receivers. Furthermore, pulse-excitation excitation and time-domain measurement signals can be used in the place of frequency domain measurement signals. Such measurement signals can be transformed into frequency measurements by utilizing a Fourier transform. The calibration methods described below are applicable to all of these signals and no limitation is intended with the presented examples. Generally speaking, a greater depth of investigation can be achieved using a larger transmitter-receiver pair spacing, but the vertical resolution of the measurement signals may suffer. Accordingly, logging tool 26 may employ multiple sets of transmitters or receivers at different positions along the wellbore 16 to enable multiple depths of investigation without unduly sacrificing vertical resolution.

Figure 1B:
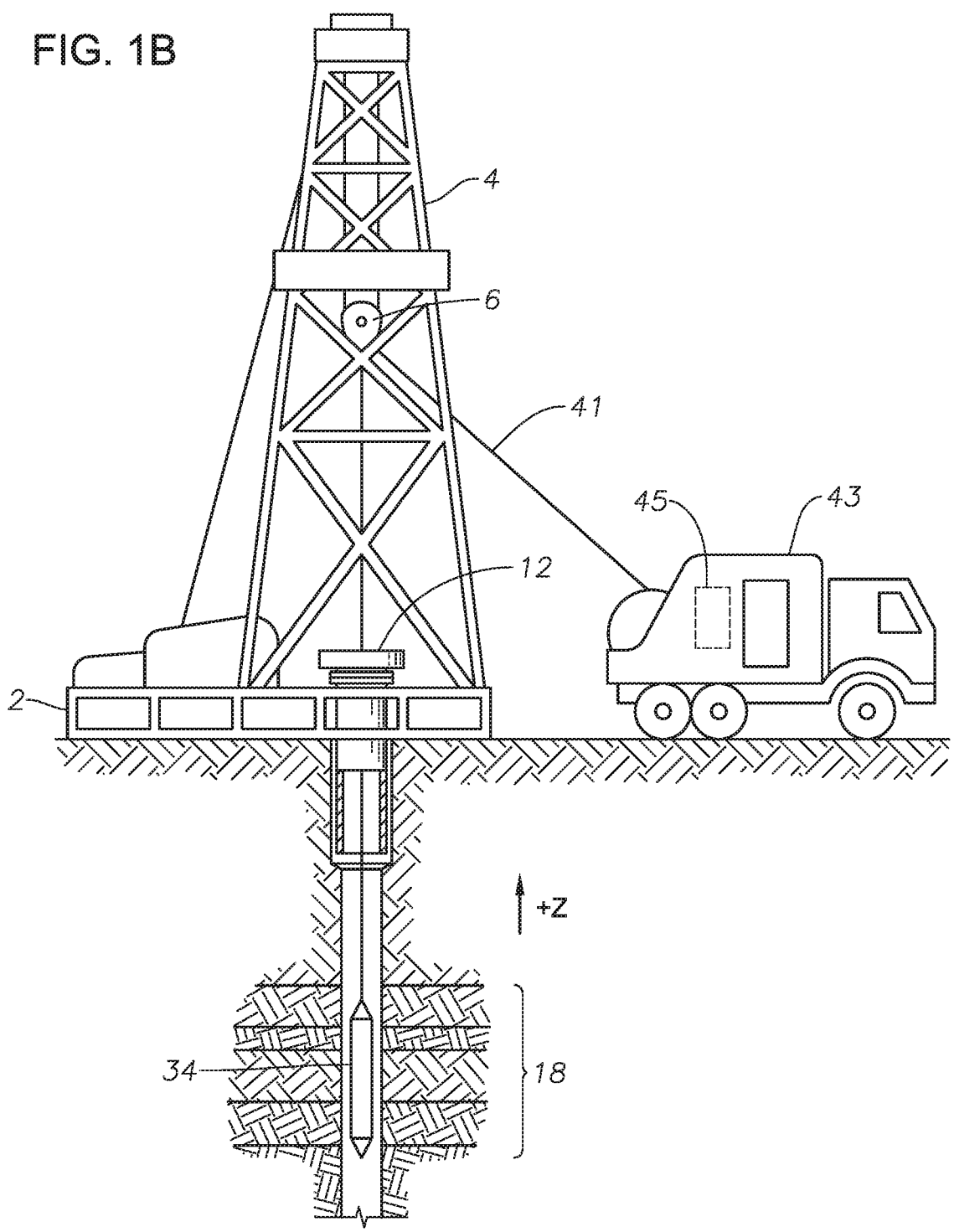
FIG. 1B illustrates a wireline logging tool that performs in-situ calibration of formation measurement signals taken along a hydrocarbon formation, according certain illustrative embodiments of the present disclosure.

FIG. 1B illustrates an alternative embodiment of the present disclosure whereby a wireline logging tool performs in-situ calibration of formation measurement signals. At various times during the drilling process, drill string 8 may be removed from the borehole as shown in FIG. 1B. Once drill string 8 has been removed, logging operations can be conducted using a wireline logging sonde 34, i.e., a probe suspended by a cable 41 having conductors for transporting power to the sonde and telemetry from the sonde to the surface. A wireline logging sonde 34 may have pads and/or centralizing springs to maintain the tool near the axis of the borehole as the tool is pulled uphole. Logging sonde 34 can include a variety of sensors including a multi-array laterolog tool for measuring formation resistivity. A logging facility 43 collects measurements from the logging sonde 34, and includes a computer system 45 for processing and storing the measurements gathered by the sensors.

FIG. 2 shows a block diagram of circuitry 200 embodied within logging tool 26 (or other logging tools described herein such as, for example, sonde 34) necessary to acquire the formation measurement signals, according to certain illustrative embodiments of the present disclosure. Logging tool 26 is comprised of one or more transmitters T1 ... TN and receivers R1 ... RN, and associated antennas, placed within grooves along logging tool 26, which may comprise, for example, magnetic dipole realizations such as coiled, tilted coil, solenoid, etc. During logging operations, pulsed or steady-state signals are generated at the transmitting antennas which interact with the formation and layer boundaries in the vicinity of logging tool 26 to produce electrical signals (i.e., measurement signals) that are picked up by the receivers. Utilizing data acquisition unit 27, system control center 25 then collects and calibrates the formation measurement signal using the methodologies described herein. Thereafter, system control center 25 records the measurement signal data to buffer 29, applies data pre-processing (using data processing unit 30) for reducing the bandwidth requirement, and then communicates the data to a remote location (surface, for example) using communication units 32 (telemetry sub 28, for example). As previously described, however, the uncalibrated formation measurement signals may be transmitted to a remote location where the calibration is then conducted. Calibration of the formation measurement signals may be conducted remotely. However, in those embodiments in which the calibration is conducted by logging tool 26, tool response times may be improved and telemetry bandwidth to other tools along the downhole string may be increased.

Although not shown in FIG. 2, circuitry 200 includes at least one processor embodied within system control center 25 and a non-transitory and computer-readable storage, all interconnected via a system bus. Software instructions executable by the processor for implementing the illustrative calibration methodologies described herein in may be stored in local storage or some other computer-readable medium. It will also be recognized that the calibration software instructions may also be loaded into the storage from a CD-ROM or other appropriate storage media via wired or wireless methods.

Moreover, those ordinarily skilled in the art will appreciate that various aspects of the disclosure may be practiced with a variety of computer-system configurations, including hand-held devices, multiprocessor systems, microprocessor-based or programmable-consumer electronics, minicomputers, mainframe computers, and the like. Any number of computer-systems and computer networks are acceptable for use with the present disclosure. The disclosure may be practiced in distributed-computing environments where tasks are performed by remote-processing devices that are linked through a communications network. In a distributed-computing environment, program modules may be located in both local and remote computer-storage media including memory storage devices. The present disclosure may therefore, be implemented in connection with various hardware, software or a combination thereof in a computer system or other processing system.

System control center 25 may further be equipped with earth modeling capability in order to provide and/or transmit subsurface stratigraphic visualizations including, for example, geo science interpretation, petroleum system modeling, geochemical analysis, stratigraphic gridding, facies, net cell volume, and petrophysical property modeling. In addition, such earth modeling capability may model well traces, perforation intervals, as well as cross-sectional through the facies and porosity data. Illustrative earth modeling platforms include, for example, DecisionSpace®, as well as its PerfWizard® functionality, which is commercially available through Landmark Graphics Corporation of Houston, Tex. However, those ordinarily skilled in the art having the benefit of this disclosure realize a variety of other earth modeling platforms may also be utilized with the present disclosure.

Figure 3A:
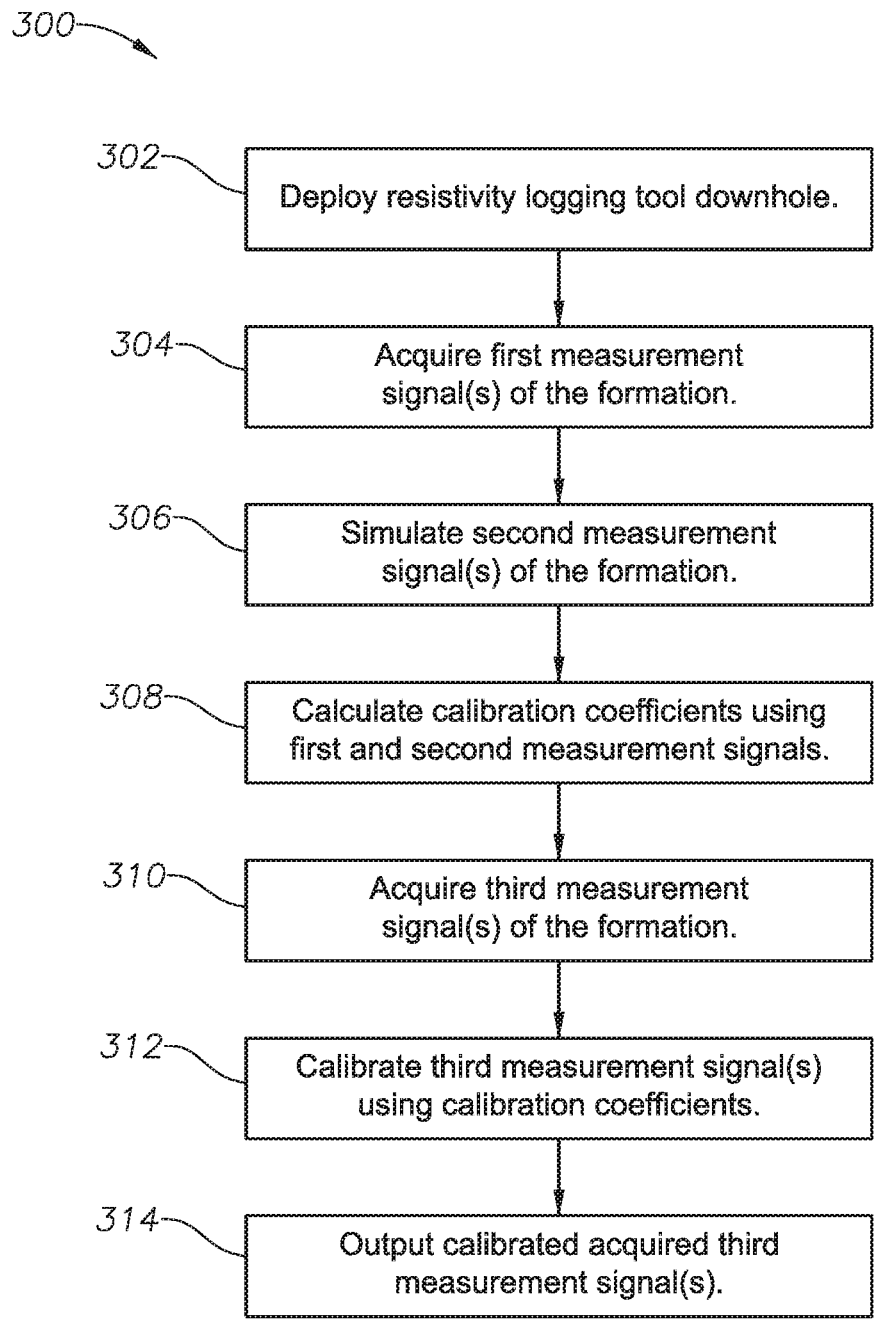
FIG. 3A is a flow chart detailing an in-situ calibration method according to certain illustrative methodologies of the present disclosure.

FIG. 3A is a flow chart detailing an in-situ calibration method 300 according to certain illustrative methodologies of the present disclosure. To assist in illustrating method 300, FIGS. 3B-3D are provided which show simplified illustrations of logging tool 26 (LWD tool, for example) deployed along wellbore 16. As described in more detail below, FIG. 3B shows logging tool 26 deployed along a calibration zone 40, FIG. 3C shows logging tool 26 deployed in an application zone 42, and FIG. 3D shows logging tool 26 deployed in a subsequent zone 44. In this example, logging tool 26 comprises three antennas, namely a transmitter T, shallow receiver $SR_1$ to receive shallow measurement signals, and a deep receiver $DR_2$ to receive deep measurement signals. However, more antennas may be utilized in alternative embodiments. Before logging tool 26 is deployed downhole, $SR_1$ is calibrated so that accurate shallow reference measurement signals 31 may be obtained downhole to aid in the calibration of subsequently obtained deep measurement signals 33. Although one of each measurement signal 31,33 is illustrated, multiple signals may be acquired.

In certain other illustrative embodiments, although calibration zone 40 is shown above application zone 42 and subsequent zone 44, it will be understood that logging tool 26 can be deployed by raising or lowering it along wellbore 16. Thus, as described herein, calibration zone 40 may in fact be located below or horizontally adjacent to application zone 42 or subsequent zones 44, etc.

Since the shallow reference measurement signals obtained by SRI are calibrated, each is an accurate and trusted signal, assuming borehole and invasion effects are addressed. Thus, as described herein, a "reference measurement signal" refers to a real and accurate measurement signal obtained by logging tool 26, which may be shallow and calibrated. Such pre-deployment calibration of logging tool 26 may be achieved in a variety of ways, such as, for example, using bench calibration with a loop antenna, temperature characterization from test heating, or by utilizing a calibrated resistivity measurement signal using a ratio of measurement signals taken different transmitters and/or receivers along logging tool 26 (such as used in Halliburton's INSITE ADR™ resistivity tool or the LOGIQ ACRt™ System).

With reference to FIGS. 3A-3D, when it is desired to perform a logging operation, logging tool 26 is then deployed downhole to a first calibration zone 40 along formation 18 at block 302. First calibration zone 40 comprises a series of wellbore depths $D_1, D_2, D_N$. At block 304, system control center 25, using various components (sensors, receivers, etc.) of logging tool 26, acquires one or more first measurement signal(s) of formation 18 along depths first calibration zone 40. As will be described in greater detail below, in certain methodologies, the first measurement signal is a deep measurement signal 33 which is utilized (along with calibrated reference measurement signal 31) to calibrate another deep measurement signal 33. In other illustrative embodiments, the first measurement signal is a deep low frequency measurement signal utilized to calibrate another deep measurement signal 33.

At block 306, system control center 25 simulates (or models) one or more second measurement signal(s) using the parameters of formation 18 along first calibration zone 40. Such parameters may include, for example, layer resistivities, layer positions, layer boundary shapes, 3D resistivity distribution, dip angle, strike angle, borehole radius, borehole resistivity, eccentricity or eccentricity azimuth. In certain embodiments, the second measurement signal is obtained from a simulated response of the same transmitter-receiver pair utilized to obtain the first measurement signal.

At block 308, system control center 25 calculates one or more calibration coefficients based on a comparison between the acquired first measurement signal and the simulated second measurement signal. To achieve this, system control center 25 utilizes one of the illustrative calibration models described below to calculate the calibration coefficients along first calibration zone 40. As further described below, the calibration coefficients may be used along first calibration zone 40 or subsequent zones to calibrate various acquired measurement signals.

At block 310, utilizing logging tool 26, system control center 25 then acquires one or more third measurement signals of formation 18 along first calibration zone 40 using the same transmitter/receiver pair utilized to obtain the first measurement signal(s) and the simulated second measurement signal(s). Alternatively, however, the third measurement signals may be acquired along application zone 42 or subsequent zones 44 along wellbore 16 or in a different wellbore altogether. Nevertheless, at block 312, system control center 25 then calibrates the acquired third measurement signals using the calibration coefficients calculated at block 308. The calibrated acquired third measurement signals are then inverted to produce desired formation parameters which are mainly related to electrical or geological properties of formation 18, such as layer resistivities, distances, direction to layers. Illustrative inversion techniques employed may include, for example, pattern matching or iterative methods utilizing look-up tables or numerical optimization based on forward modeling, as will be understood by those ordinarily skilled in the art having the benefit of this disclosure. Illustrative formation parameters may include, for example, layer resistivities, layer positions, layer boundary shapes, 3D resistivity distribution, dip angle, strike angle, borehole radius, borehole resistivity, eccentricity or eccentricity azimuth.

At block 314, system control center 25 then outputs the calibrated acquired third measurement signal(s). Here, the output may take a variety of forms such as, for example, simply transmitting the data to a remote location (surface, for example) or outputting the data in a report or geological model. Accordingly, the acquired third measurement signals are calibrated in-situ (while logging tool 26 is in wellbore 16, for example).

Thereafter, a variety of wellbore operations may be performed based upon the formation parameters. For example, drilling decisions such as landing, geosteering, well placement or geostopping decisions may be performed. In the case of landing, as the bottom hole assembly drilling the well approaches the reservoir from above, the reservoir boundaries are detected ahead of time, thus providing the ability to steer the wellbore into the reservoir without overshoot. In the case of well placement, the wellbore may be kept inside the reservoir at the optimum position, preferably closer to the top of the reservoir to maximize production. In the case of geostopping, drilling may be stopped before penetrating a possibly dangerous zone.

Moreover, in certain illustrative methodologies, the calibration coefficients are calculated at a low angle section of the wellbore (inclination<45 degrees, for example), and calibration is then applied to third measurement signals acquired from a high angle section of the wellbore (inclination>45 degrees, for example).

The foregoing method 300 embodies a general overview of the illustrative methodologies of the present disclosure. Below, more detailed alternative methodologies of the present disclosure will be described. As described therein, the acquired and simulated measurement signals may take on a variety of forms. For example, the reference or simulated measurement signals may be acquired from another wellbore which may or may not have similar formation properties or be located within the same reservoir. However, having such commonalities may improve the accuracy of the calibration since the calibration would be performed in similar conditions. In other examples, the acquired first measurement signals, simulated second measurement signals, and the acquired third measurement signals may all be deep measurement signals. Such deep measurement signals may, for example, have a radial range of 25 feet or more, while the shallow signals have a range less than that (10 feet or less, for example).

In yet another alternative methodology, the simulated second measurement signal may be substantially depth invariant (i.e., the change of the signal with respect to depth is small enough such that it is considered constant for all practical purposes). In certain embodiments, the shallow reference measurement signals may be obtained from a separate transmitter and/or receiver along logging tool 26, as compared to the transmitter-receiver pair utilized to acquire the deep measurement signals. Alternatively, the shallow reference measurement signals may be obtained from an existing resistivity tool integrated into the bottom hole assembly of which logging tool 26 forms a part. These and other alterations of the present disclosure will be understood to those ordinarily skilled in the art having the benefit of this disclosure.

FIG. 4 is a flow chart detailing an in-situ calibration method 400 whereby an acquired deep measurement signal (i.e., third measurement signal) is calibrated using a modeled deep measurement signal (i.e., second measurement signal) and a reference measurement signal, according to one or more alternative illustrative methodologies of the present disclosure. With reference to FIGS. 3B-4, as previously described, logging tool 26 is first deployed downhole into wellbore 16 to first calibration zone 40 at block 402. At block 404, system control center 25 acquires one or more calibrated reference measurement signal(s) 31 along the depth of first calibration zone 40.

At block 406, system control center 25 calculates a layer resistivity profile of the formation along first calibration zone 40 using the acquired reference measurement signals 31, which may be shallow, compensated, or both shallow and compensated. As understood by those ordinarily skilled in the art, "compensated" refers to a weighted average of two or more measurement signals in the logarithmic amplitude or phase domain. The calibrated reference measurement signals 31 are not necessarily taken from the same transmitter-receiver pair utilized to obtain the deep measurement signals 33. In certain embodiments, the resistivity profile is calculated from interpretation of the reference measurement signal by use of inversion, which can be applied by various methodologies (a look up table that converts amplitude ratios or phase differences to resistivities, a tool coefficient that converts voltages to conductivities, or using a numerical optimization algorithm that can solve for layer resistivities given reference measurement signals, for example). Such inversion methods are readily understood by those ordinarily skilled in the art having the benefit of this disclosure.

At block 408, system control center 25 selects a set of calibration depths $CD_1$, $CD_2$, $CD_N$ along first calibration zone 40. Calibration depth selection is important to optimize the accuracy of calibration for the deep measurement signals (i.e., third measurement signals). The depths may be selected, for example, in the upper sections of the well, preferably where there are relatively small variations in the resistivity profile. In this example, relatively small may be defined as the variation being smaller than at least 90% of all measurement depths available. In other environments, threshold numbers can be used generally between 70% and 95%. The particular number is chosen to optimize calibration performance and it is a function of formation variability and measurement noise. An alternative threshold may be based on an absolute rate of change value, which may be selected and optimized heuristically based on past experience with different wells, or well sections.

In other words, the calibration coefficients may be calculated at depths that satisfy a criterion based on a rate of change in the acquired deep measurement signals as a function of depth. In certain illustrative embodiments, the criterion comprises selection of depths that have a rate of change below a threshold value that is small enough to minimize the calibration error, but large enough to provide a sufficient number calibration points necessary to perform the calculations. As an example, threshold can be chosen to be 90% point of the histogram of rate of change with respect to depth (i.e., the rate of change at which 90% of all rate of change values are larger and 10% of all rate of change values are smaller). Other threshold numbers, typically between 75% and 95%, could also be used. The particular number is chosen to optimize calibration performance and it is a function of formation variability and measurement noise. An alternative threshold may be based on an absolute rate of change value. This value can be selected and optimized heuristically based on past experience with different wells, or well sections. In addition, the amount of invasion in the reference measurement signal is also critical, as depths are preferably chosen in formations where no invasion is expected. An illustrative optimum calibration depth selection methodology will be provided in an example below.

At block 410, utilizing logging tool 26, system control center 25 acquires one or more deep measurement signals 33 (i.e., first measurement signals) along first calibration zone 40 of formation 18. In certain embodiments, the selected depths at which to acquire the deep measurement signals 33 may be different compared to the selected calibration depths $CD_1$, $CD_2$, $CD_N$. In such embodiments, an interpolation or extrapolation operation on deep measurement signals 33 can be conducted to estimate the corresponding signals at depths $CD_1$, $CD_2$, $CD_N$, which are then used in the subsequent steps.

At block 412, system control center 25 models one or more deep measurement signals (i.e., second measurement signals) using the resistivity profile of the formation layers at the selected calibration depths $CD_1$, $CD_2$, $CD_N$ using the same transmitter-receiver pair (T-$DR_2$) utilized to obtain the deep measurement signals 33 (i.e., first measurement signals) at block 410. In one illustrative methodology, this modeling can be achieved by solution of Maxwell's equations or a different equation derived from Maxwell's equations that can solve for the signals at the receivers given the transmitted signal and the formation electrical parameters (the most important of which is formation resistivity). For the formation, simplified models may be used occasionally to improve speed of computation. These models may include, for example, zero-dimensional (0D) models where the formation resistivity profile is constant in all three dimensions, one-dimensional (1D) models where the formation resistivity profile is constant in two dimensions, two-dimensional (2D) models where the formation resistivity profile is constant in one dimension, and three-dimensional (3D) models where the formation resistivity profile is varying in all three dimensions. In addition, solution of Maxwell's equations may be obtained through analytical or semi-analytical expressions, finite-difference, finite-element, integral equation or methods of moments algorithms, as will be understood by those ordinarily skilled in the art having the benefit of this disclosure. The following analytical function may be utilized to represent this:

$$V_{cm}(z_i) = \text{MODEL}(R(z)) \qquad \text{Eq. (1),}$$

where $V_{cm}$ is the compensated simulated (deep) measurement, $z_i$ is the axial direction with respect to wellbore 16, R is the resistivity of the formation layers, and MODEL is the Electromagnetic Model described above in relation to block 412. Using this illustrative embodiment, all possible effects of the deep measurement signal(s) acquired at block 410 should be taken into effect during modeling such as, for example, the effects of the tool body presence, borehole fluid, antenna enclosures, frequency dispersive characteristic of resistivity, etc. Such effects are important because any mismatch between the simulated/modeled and real (acquired) measurement signals will result in inaccurate calibration coefficients and/or inaccurate calibration.

At block 414, system control center 25 then selects/interpolates/extrapolates deep measurement signal(s) 33 acquired at block 410 at the selected calibration depths $CD_1$, $CD_2$, $CD_N$. At block 416, system control center 25 then calculates the calibration coefficients using deep measurement signal(s) 33 (i.e., first measurement signals) acquired at block 410 and the simulated deep measurement signal(s) (i.e., second measurement signals).

To achieve this, system control center 25 performs a comparison of deep measurement signal(s) 33 (i.e., first measurement signals) acquired at block 410 and the simulated deep measurement signal(s) (i.e., second measurement signals) to determine the calibration coefficients using the following equations:

$$V_{cm}(z_i) = F(V_d(z_i)) \quad \text{Eq. (2).}$$

For example, $V_{cm}(z_i) = A \times V_d(z_i) + B$, where F is the calibration model, $V_d$ is deep measurement signal acquired at block 410, A is a gain and B is an offset which is one or more calibration coefficients associated with the calibration model. Calibration model F, may be a polynomial of another analytical function.

At block 418, logging tool 26 obtains additional deep measurement signal(s) (i.e., third measurement signals). These deep measurement signals (i.e., third measurement signals) may be acquired along calibration zone 40, or in subsequent zones along formation 18 and calibrated using the calibration coefficients determined along first calibration zone 40. Such deep measurement signals may also be represented by numeral 33, although they are not illustrated as such for simplicity. At block 420, system control center 25 calibrates the acquired deep measurement signal(s) (i.e., third measurement signals) using the calibration coefficients via the following equation:

$$V_{dc}(z) = F(V_d(z)) \quad \text{Eq. (3),}$$

where $V_{dc}(z)$ is the calibrated acquired deep measurement signal(s) (i.e., third measurement signals). As previously mentioned, the deep measurement signals acquired at block 418 may be measured along first calibration zone 40 or a subsequent zone, and calibrated as previously described. In the latter approach, with reference to FIGS. 3C-3D, logging tool 26 may be moved (e.g., raised or lowered) to an application zone 42 located along a range of wellbore depths which differ from the depths of first calibration zone 40. As logging tool 26 is moved along application zone 42, one or more deep measurement signals (i.e., third measurement signals) are acquired and calibrated using the calibration coefficients calculated along first calibration zone 40. Nevertheless, in either embodiment, at block 422, system control center 25 then outputs the calibrated acquired deep measurement signal(s) as previously described. Moreover, logging tool 26 may then be deployed further to subsequent zone 44 whereby further deep measurement signals are obtained and calibrated using the calibration coefficients.

Figure 5B:
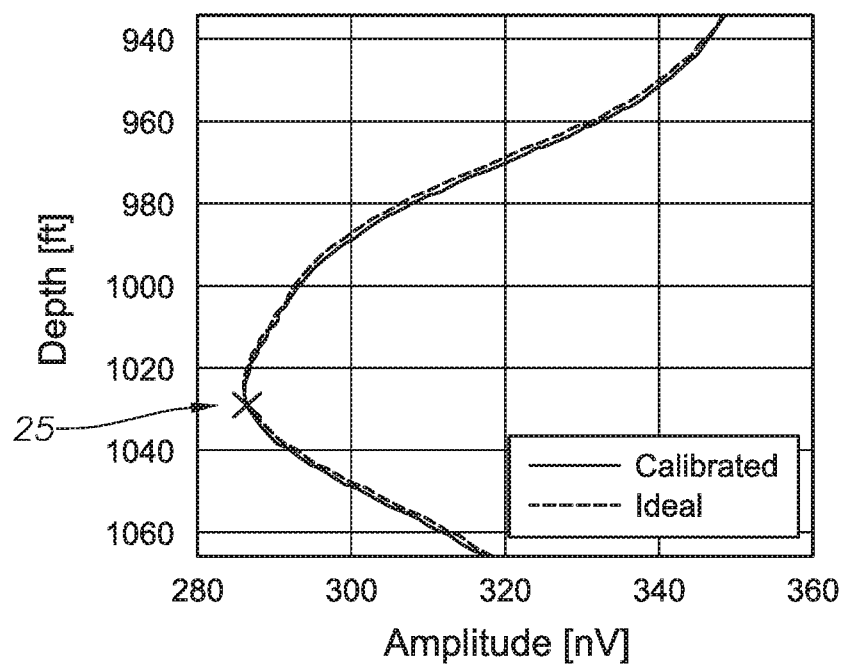
FIGS. 5B-5G are graphs illustrating the calibration accuracy of the method of FIG. 4 whereby calibration is performed at each depth.
Figure 5C:
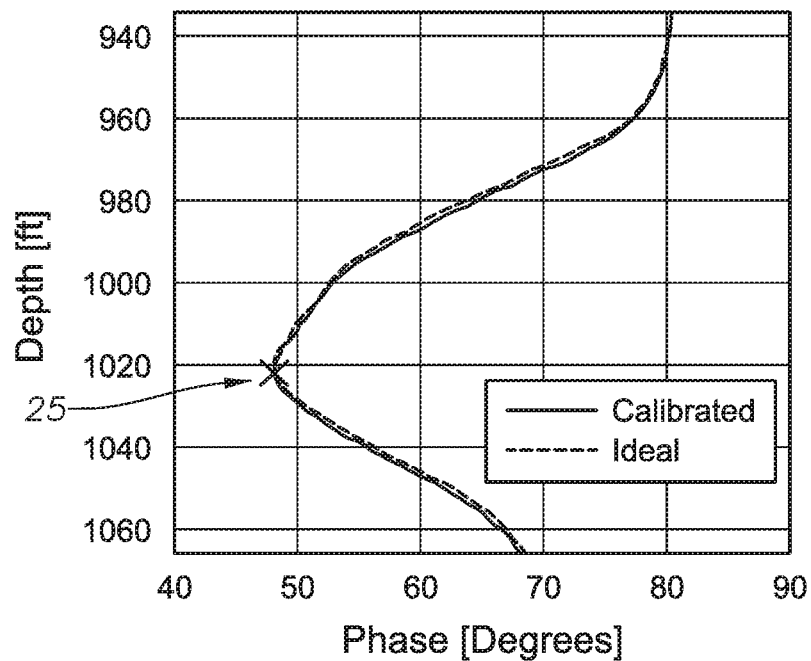
Figure 5D:
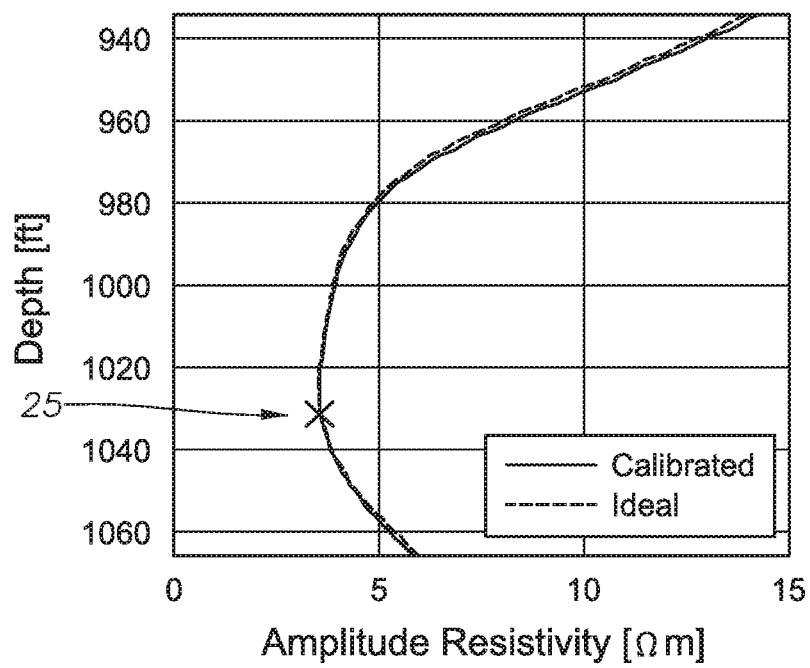
Figure 5E:
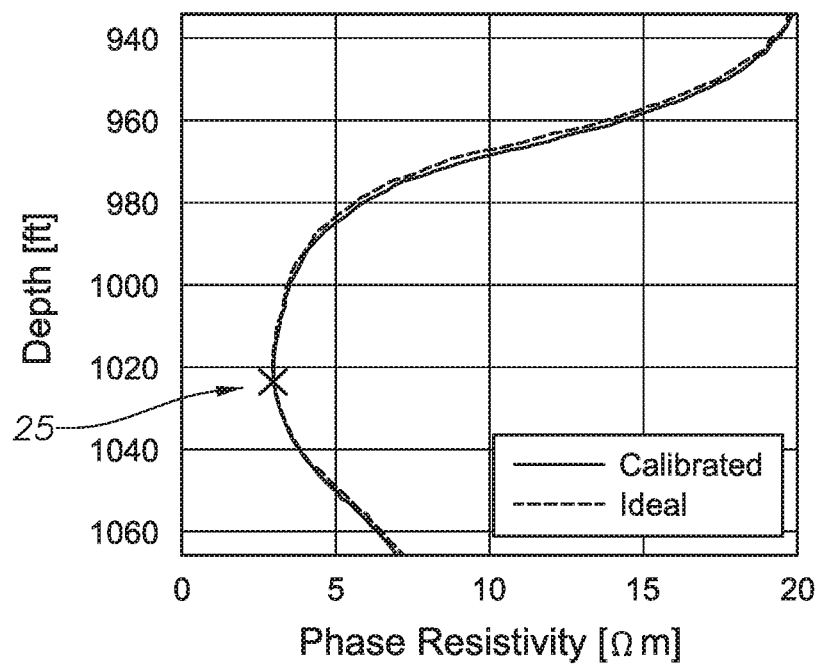
Figure 5F:
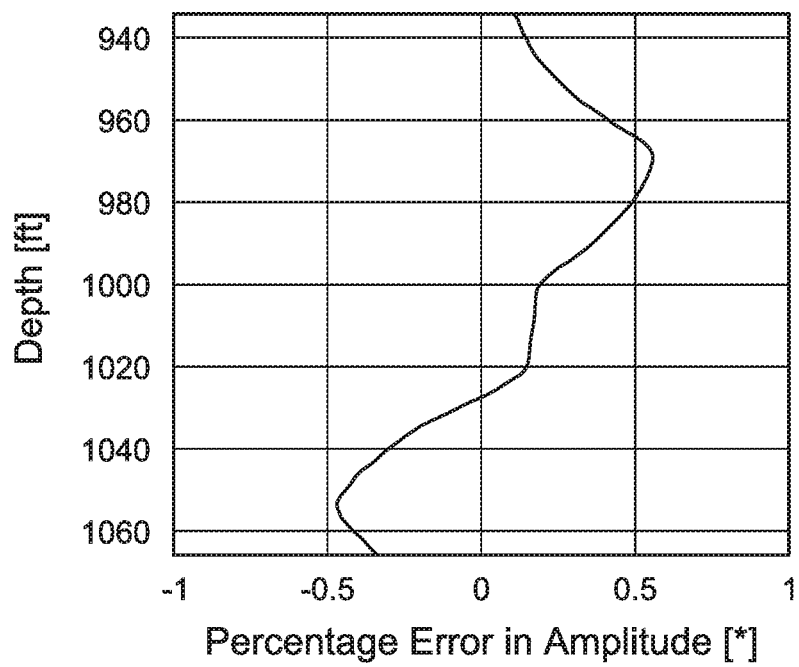
Figure 5G:
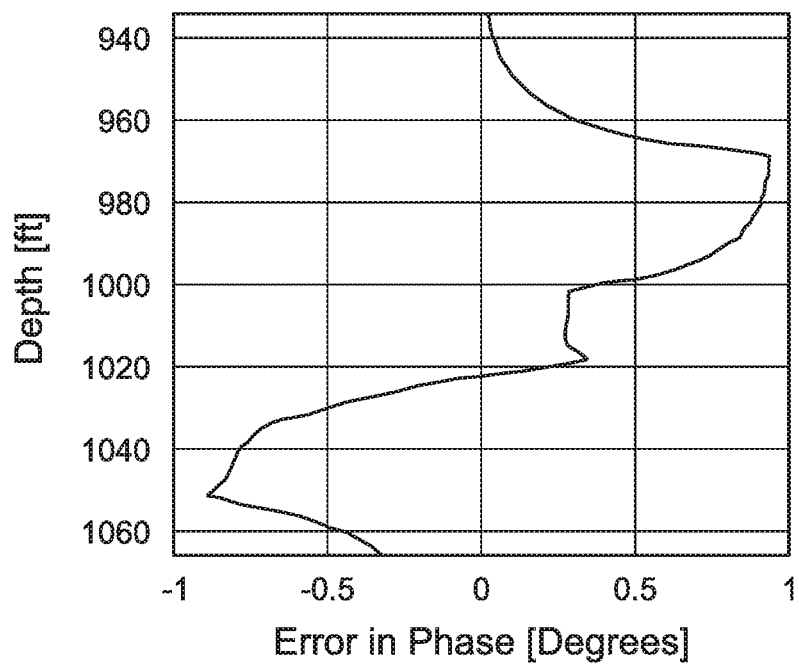

To further demonstrate an illustrative calibration method, an example will now be discussed with reference to FIGS. 5A and 5B. FIG. 5A illustrates a modeled log response generated from 0D inversion using an illustrative methodology described herein. The log charts wellbore depth in feet versus formation resistivity. Details of an illustrative logging tool 26 are also shown in the insert of FIG. 5A. Four uppermost antennas A1-A4 are used to acquire the compensated shallow reference measurement signals above logging tool 26, where antennas A1-A4 are axially oriented coil transmitters and A2 and A3 are tilted coiled receivers. The deep antenna A5, which is the lowermost antenna, is placed as low as possible in the bottom hole assembly, which is in practice next to the bit to maximize depth of detection. In this illustrative embodiment, antenna A5 is 568 inches below antenna A4, antenna A4 is positioned 12 inches below antenna A3, antenna A3 is positioned 8 inches below antenna A2, and antenna A2 is positioned 12 inches below antenna A1.

In this example, the deep antenna A5 is a receiver that is used in conjunction with antenna A1 (transmitter), but at a different frequency when compared to the shallow signal. Two frequencies of operation were used: 500 KHz for the calibrated shallow measurement signal (2 feet range), which is excited from antennas A1/A4 and received by antennas A2/A3, respectively; and 5 KHz for the deep measurement signal (50 feet range), which is excited from antenna A1 and received by antenna A5. It is noted here that the four measurement signals that are received from combinations of A1,A4 transmitters and A2,A3 receivers are processed to produce a single compensated signal, as understood in the art of induction well logging with tools such as Halliburton's INSITE ADR™ or LOGIQ ACRt™. In this example, no calibration error for the deep measurement signal is assumed, so the deep measurement signal that is shown is the ideal response which is not available in practice. Relative dip angle of the formations, $\theta_{dip}$, is assumed to be zero degrees in this example without loss of generality of the method. It can be seen from the synthetic log that the calibrated shallow measurement signals define the formation boundary positions, while the deep measurement signal averages out multiple layers at once. The shallow measurement signal in FIG. 5A will be input to the various methods described herein. The deep measurement signal is shown only as a reference. In this example, method 400, and a 1D formation model with a resistivity profile given by the shallow resistivity curve in FIG. 5A, is used.

FIGS. 5B-5G are graphs illustrating the calibration accuracy of method 400 where calibration coefficients are computed from the shallow section and applied to the deep section repeatedly at each depth. FIGS. 5B-5E shows the calibrated deep measurement signal as an output of the method 400, as well as the ideal deep measurement signal taken from FIG. 5A. As shown, the calibrated and ideal amplitude (5B), phase (5C), amplitude resistivity (5D), and phase resistivity (5E) are each plotted verses the depth. The closeness of the two curves illustrates how well method 400 is operating. In these examples, a multiplicative model is used for correction $F(V_d) = KV_d$, where K is a calibration coefficient calculated and applied to data measured at the same depth. It can be seen from the last two subfigures that the error in calibration is about 0.5% and 1 degree maximum. However, as previously mentioned, depth selection is important to optimize the accuracy of calibration for the deep measurement signal, thus improving accuracy. It can be seen from FIG. 5F (plots % error in Amplitude) and 5G (plots error in phase) that accuracy is maximized at minimum and maximum peaks of the log (i.e., when the derivative of the resistivity, amplitude or phase curves are close to zero).

Therefore, in some illustrative embodiments, calibration should be applied only at depths $CD_1$, $CD_2$, $CD_N$ which correspond to the peaks, or zero slopes ZS (FIGS. 5B-5E), of the resistivity curves of the log response. After each peak, the resulting calibration coefficients may be used in the subsequent depth points (i.e., subsequent zones), as previously described. Accordingly, through use of this alternative method, the accuracy of the calibration methods describes herein is significantly improved.

In general, calibration performed at every depth is valid in the vicinity of that depth, since temperature characteristic does not vary significantly. However, as logging tool 26 moves to substantially different temperatures, its characteristics usually drifts and, thus, calibration needs to be repeated. Since it is not straightforward to detect drifts in tool characteristics, calibration needs to be periodically applied, for example, at calibration depths $CD_1$, $CD_2$, $CD_N$ that correspond to every peak of the resistivity curves in a given calibration zone, or in pre-determined periods. Therefore, certain illustrative embodiments of the present disclosure may also periodically re-calculate calibration coefficients (i.e., recalibrate) logging tool 26 using any of the methodologies described herein. In such embodiments, for example, with reference to FIGS. 3B-3D, logging tool 26 may be deployed to first calibration zone 40 where the calibration coefficients are determined, and then deployed down to application zone 42 where the deep measurement signals are acquired and calibrated using the calibration coefficients. Simultaneously, logging tool 26 may repeat the functions necessary to calculate new calibration coefficients using measurement signals acquired and modeled along application zone 42 (which essentially makes application zone 42 a second calibration zone). The new calibration coefficients may then be utilized to calibrate deep measurement signals (i.e., fourth measurement signals) acquired in the second calibration zone or a subsequent third calibration zone 44. Also note there may be overlap in the calibration/application depths. Ultimately, however, this process may be repeated as desired. Since a shallow measurement signal is typically is not available in the vicinity of the effective deep measurement signal depth immediately after it is acquired, an extrapolation of calibration coefficients can be performed to estimate the calibration coefficients that correspond to the effective depth of the deep measurement signal.

Figure 6A:
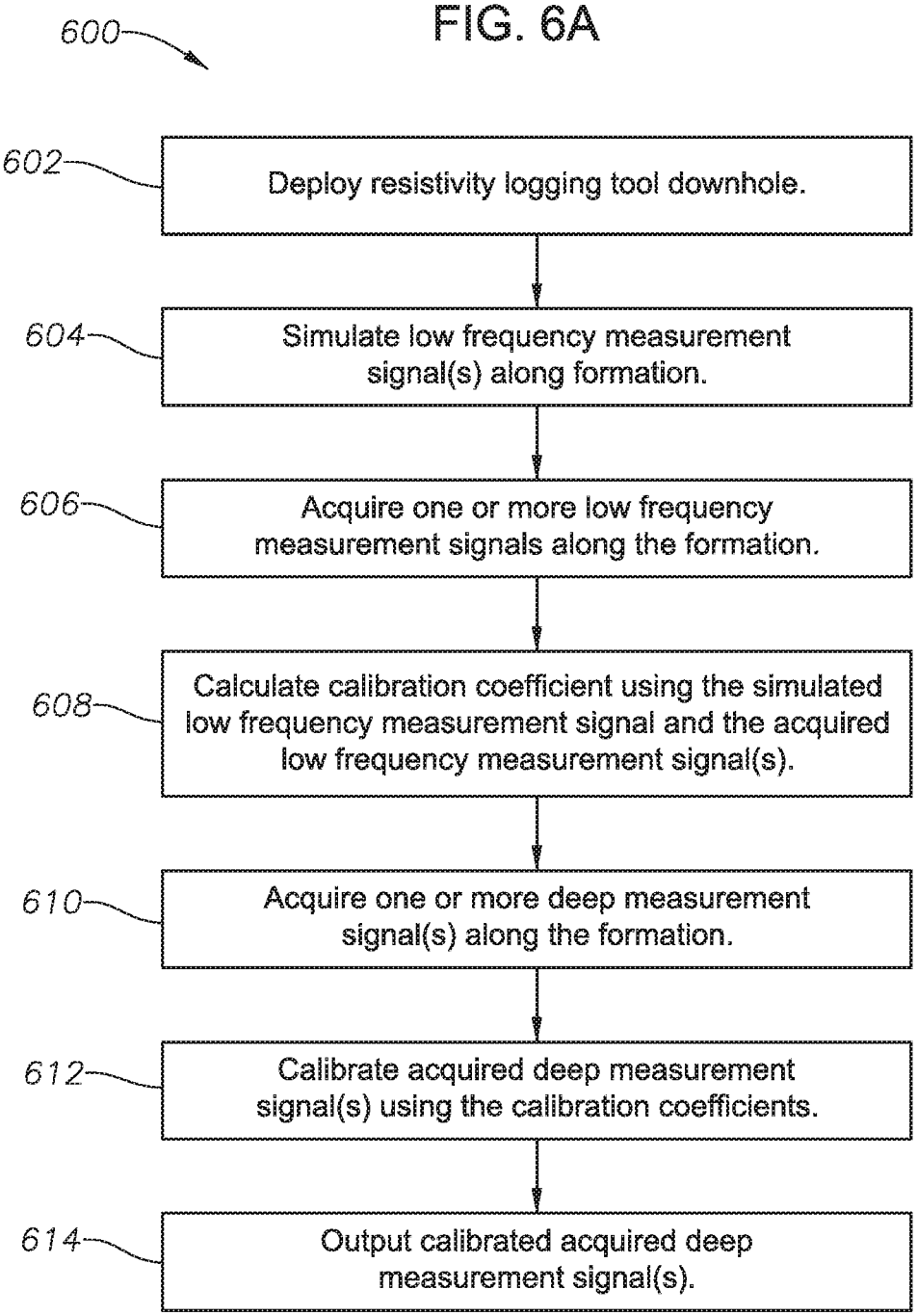
FIG. 6A is a flow chart detailing an in-situ method whereby an acquired deep measurement signal is calibrated using a modeled low frequency measurement signal, according to certain illustrative methodologies of the present disclosure.

FIG. 6A illustrates a flow chart detailing an in-situ method 600 whereby an acquired deep measurement signal (i.e., third measurement signals) is calibrated using one or more simulated low frequency measurement signal(s) (i.e., second measurement signal) and low frequency measurement signal(s) (i.e., first measurement signal). The low frequency measurement signal(s) have a frequency low enough such that the signal is not affected by variations along formation 18. In other words, the frequency should be low enough such that the received low frequency measurement signal is substantially independent of the practical range of formation conductivity. Thus, no resistivity profile is necessary since the low frequency measurement signal is not sensitive to it. This may be, for example, 500 Hz for a 50 feet logging tool, with the frequency being proportional to the inverse of the distance-squared (~K/(d$^2$)), where K is a constant factor and d is the distance. In another example using a 100 feet tool, the frequency may be 125 Hz for a similar error. The required frequencies may be determined and adjusted as necessary, as will be understood by those ordinarily skilled persons described herein.

Figure 6B:
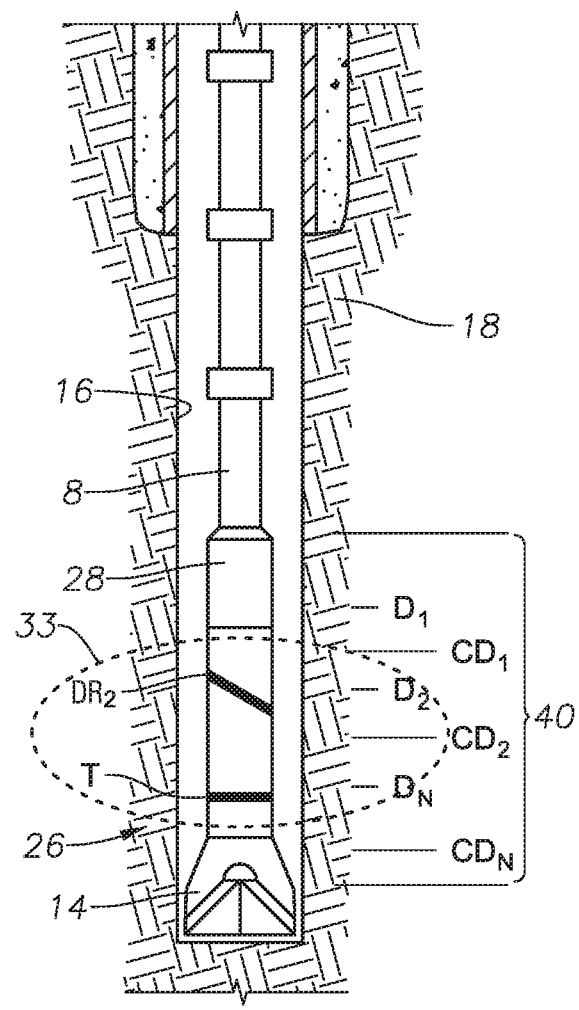
FIG. 6B illustrates an illustrative logging tool deployed in a calibration zone, according to an alternate embodiment of the present disclosure.

FIG. 6B illustrates an illustrative logging tool of the present disclosure deployed in a calibration zone along a drill string 8. However, in other illustrative embodiments, the logging tool may be deployed via a wireline or other deployment methodology as previously described. Nevertheless, in FIG. 6B, logging tool 26 is similar to those previously described except that, in FIG. 6B, logging tool 26 only includes two antennas T and DR$_2$. With reference to FIG. 6B, at block 602, just as previously described, logging tool 26 is deployed downhole to first calibration zone 40. At block 604, system control center 25 simulates a deep low frequency measurement signal $V_{Im}$ (i.e., second measurement signal) along first calibration zone 40 of formation 18 using the same transmitter-receiver pair (T-DR$_2$) used to obtain the deep measurement signals. At block 606, system control center 25, using logging tool 26, acquires one or more deep low frequency measurement signals 33, $V_f(z)$ (i.e., first measurement signals). After the low frequency measurement signals 33 are applied to formation 18, the received signals are recorded by system control center 25. Since the low frequency measurement signals 33 are not affected by the formation properties, they can be compared to a constant (pre-calculated, for example) reference from modeling and a calibration function is then calculated as described below. For example, the constant reference signal may be generated by performing modeling with a fixed (and high>1000 Ohm, for example) formation resistivity. As described in previously methodologies, the calibration coefficients generated using the calibration function are applied to the deep measurement signals (i.e., third measurement signals) that have been acquired or that will be acquired at subsequent depths.

At block 608, system control center 25 calculates the calibration coefficients using the simulated deep low frequency measurement signal(s) (i.e., second measurement signals) and the acquired deep low frequency measurement signals 33 (i.e., first measurement signals). Here, system control center 24 makes a comparison between the simulated low frequency measurement signal(s) (i.e., second measurement signals) and the acquired low frequency measurement signal(s) 33 (i.e., first measurement signals) to determine the calibration coefficients. The following equation may be utilized:

$$C(z)=F(V_{Im}*V_f(z))$$  Eq. (4), where, $V_{Im}$ is the modeled deep signal, and $V_f(z)$ is the measured deep signal 33, for example, $C(z)=V_{Im}/V_f(z)$. Although not illustrated, at block 610, as described in FIGS. 3B-3D, system control center 25 acquires one or more deep measurement signal(s), $V_d(z)$, (i.e., third measurement signals) along first calibration zone 40 or subsequent zones. At block 612, system control center 25 calibrates the acquired deep measurement signal(s) (i.e., third measurement signals) using the calibration coefficients using, for example:

$$V_{dc}(z)=C(z)*V_d(z)$$  Eq. (5).

At block 614, system control center 25 then outputs the calibrated acquired deep measurement signal(s) (i.e., third measurement signals) as previously described. Accordingly, a deep low frequency measurement signal may be utilized to calibrate an acquired deep measurement signal in-situ.

Figure 7:
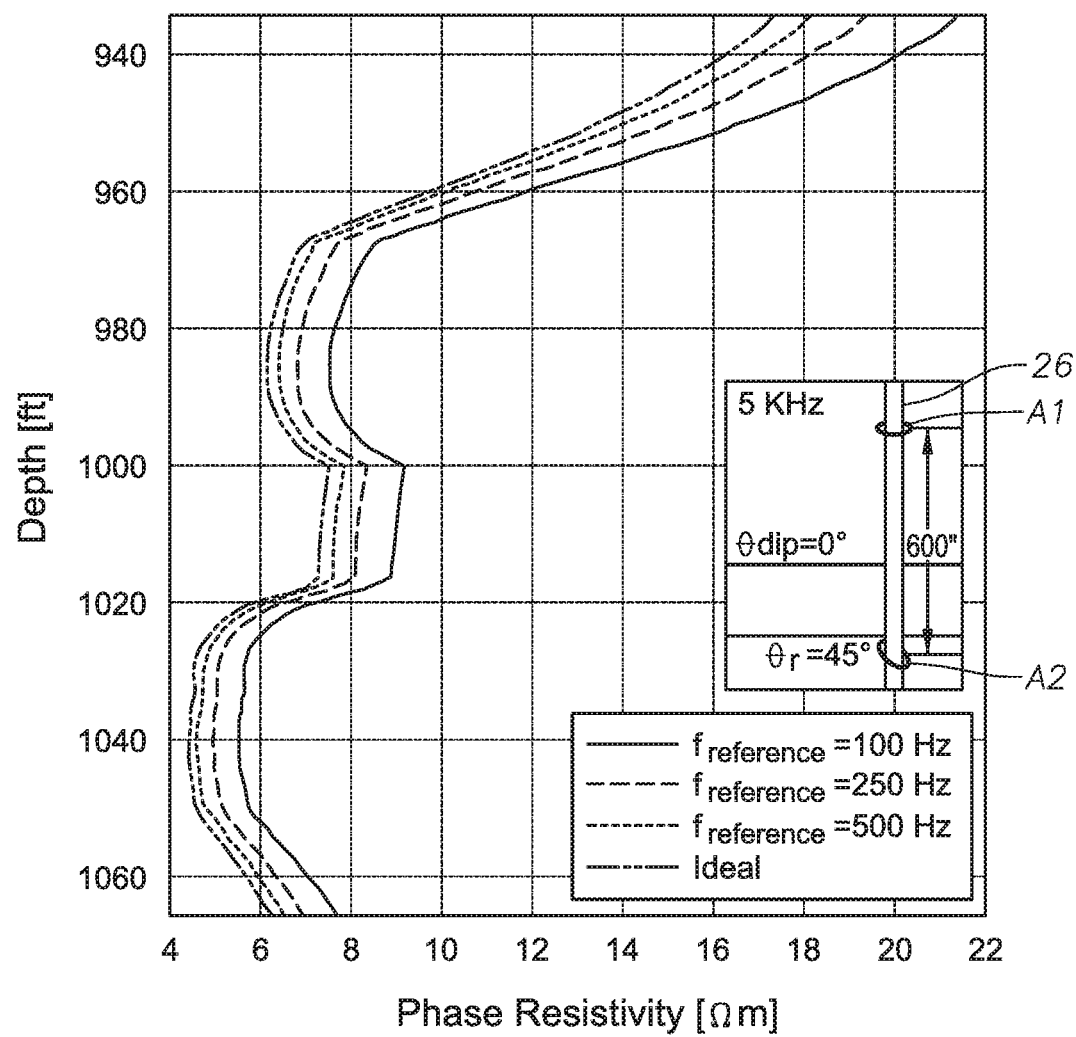
FIG. 7 is a graph illustrating the accuracy of the method of FIG. 6A using three different reference low frequencies measurement signals.

FIG. 7 is a graph showing the accuracy of method 600 using three different low frequencies measurement signals. FIG. 7 plots the wellbore depth versus phase resistivity for frequency references at 100 Hz, 250 Hz, 500 Hz and a theoretically ideal calibrated signal. Details of an illustrative logging tool 26 are also shown in the insert of FIG. 7. Two antennas A1 and A2, spaced 600 inches apart, are used to acquire the low frequency measurement signals. The deep antenna A2 is placed at the bottom of logging tool 26, which is in practice next to the bit to maximize depth of detection, at an angle of 45°. The relative dip angle of the formation, $\theta_{dip}$, in this example is assumed to be zero without loss of generality.

As can be seen, lower frequencies are better references, and the 100 Hz signal reduces the error to a negligible value. Therefore, in this example, calibration that is conducted at this frequency should be accurate enough to allow interpretation of the calibrated data. It should be noted here that low frequencies result in smaller signal levels since signals from the coils are proportional to the frequencies for a constant current supply. However, this can be negated by having more numbers of turns for the coils, which increases the sensor size. In one illustrative embodiment of logging tool 26, it is possible to apply the low frequency measurement signal simultaneously with the deep measurement signal to make sure these two measurements are made at the same electrical/mechanical conditions. This can reduce the errors in the calibration. Finally, the frequency of the low frequency measurement signal used as the reference can be adapted based on the expected or measured resistivity of the formations, which will optimize the signal levels as well as measurement accuracy.

Embodiments of the present disclosure described herein further relate to any one or more of the following paragraphs:

1. A method for in-situ calibration of a logging tool deployed along a wellbore, the method comprising acquiring a first measurement signal of a formation using the logging tool; simulating a second measurement signal of the formation; calculating a calibration coefficient based on a comparison between the acquired first measurement signal and the simulated second measurement signal; acquiring a third measurement signal of the formation using the logging tool, wherein the first, second and third measurement signals correspond to the same transmitter-receiver pair of the logging tool; and calibrating the acquired third measurement signal using the calibration coefficient.

2. A method as defined in paragraph 1, wherein the acquired first measurement signal, simulated second measurement signal, and acquired third measurement signal are all deep measurement signals.

3. A method as defined in any of paragraphs 1-2, wherein simulating the second measurement signal further comprises acquiring a reference measurement signal of the formation using the logging tool; calculating layer resistivity data of the formation using the acquired reference measurement signal; selecting a set of calibration depths along the wellbore; and simulating the second measurement signal at the selected calibration depths using the layer resistivity data.

4. A method as defined in any of paragraphs 1-3, wherein the reference measurement signal is a shallow measurement signal.

5. A method as defined in any of paragraphs 1-4, wherein the first measurement signal is acquired at a depth which corresponds to at least one of the selected set of calibration depths.

6. A method as defined in any of paragraphs 1-5, wherein the reference measurement signal is acquired within a first calibration zone of the formation, the first calibration zone being a first range of wellbore depths; the first measurement signal is acquired within the first calibration zone; the second measurement signal is simulated within the first calibration zone; and the third measurement signal is acquired within an application zone located along a second range of wellbore depths different from the first calibration zone.

7. A method as defined in any of paragraphs 1-6, wherein selecting the set of calibration depths further comprises generating a log response of a plurality of acquired first measurement signals; and selecting those calibration depths which correspond to zero slopes along the log response.

8. A method as defined in any of paragraphs 1-7, wherein the acquired first measurement signal is a low frequency signal comprising a frequency low enough such that the acquired first measurement signal is not affected by variations in the formation.

9. A method as defined in any of paragraphs 1-8, wherein the acquired first and third measurement signals are deep measurement signals.

10. A method as defined in any of paragraphs 1-9, wherein the simulated second measurement signal is substantially depth invariant.

11. A method as defined in any of paragraphs 1-10, wherein the first measurement signal is acquired within a first calibration zone of the formation, the first calibration zone being a first range of wellbore depths; the second measurement signal is simulated within the first calibration zone; and the third measurement signal is acquired within an application zone located along a second range of wellbore depths different from the first calibration zone.

12. A method as defined in any of paragraphs 1-11, further comprising acquiring a fourth measurement signal within a second calibration zone of the formation, the second calibration zone being a third range of wellbore depths different from the first calibration zone; and calibrating the acquired fourth measurement signal.

13. A method as defined in any of paragraphs 1-12, wherein calculating the calibration coefficient further comprises utilizing a calibration model to calculate a plurality of calibration coefficients along a calibration zone of the formation, the calibration zone being a first range of wellbore depths, wherein the third measurement signal is acquired and calibrated within an application zone located along a second range of wellbore depths different from the calibration zone.

14. A method as defined in any of paragraphs 1-13, wherein calculating the calibration coefficient further comprises utilizing a calibration model to calculate a plurality of calibration coefficients along a calibration zone of the formation, the calibration zone being a first range of wellbore depths, wherein the third measurement signal is acquired and calibrated within the calibration zone.

15. A method as defined any of paragraphs 1-14, wherein the calibration model is a polynomial function.

16. A method as defined in any of paragraphs 1-15, wherein the calibration model is $F(X)=AX$, where A is a calibration coefficient.

17. A method as defined in any of paragraphs 1-16, wherein the calibration model is $F(X)=AX+B$, where A and B are the calibration coefficients.

18. A method as defined in any of paragraphs 1-17, wherein the calibration coefficients are calculated at depths that satisfy a criterion based on a rate of change in third measurement signal as a function of depth.

19. A method as defined in any of paragraphs 1-18, wherein the criterion comprises selection of depths that have a rate of change below a threshold value.

20. A method as defined in any of paragraphs 1-19, wherein the simulated second measurement signal is simulated using parameters of the formation in which the logging tool is deployed; parameters of another formation in which the logging tool is not deployed; or a constant formation resistivity.

21. A method as defined in any of paragraphs 1-20, wherein the first measurement signal corresponds to the transmitter-receiver pair of the second and third measurement signals.

22. A method as defined in any of paragraphs 1-21, wherein the logging tool forms part of a logging while drilling or wireline assembly.

23. A method as defined in any of paragraphs 1-22, wherein calculating the calibration coefficient further comprises calculating the calibration coefficient at a low angle section of the wellbore, wherein the third measurement signal is acquired from a high angle section of the wellbore.

Moreover, the foregoing paragraphs and other methodologies described herein may be embodied within a system comprising processing circuitry to implement any of the methods, or a in a computer-program product comprising instructions which, when executed by at least one processor, causes the processor to perform any of the methods described herein.

Although various embodiments and methodologies have been shown and described, the disclosure is not limited to such embodiments and methodologies and will be understood to include all modifications and variations as would be apparent to one skilled in the art. Therefore, it should be understood that the disclosure is not intended to be limited to the particular forms disclosed. Rather, the intention is to cover all modifications, equivalents and alternatives falling within the spirit and scope of the disclosure as defined by the appended claims.

What is claimed is:

1. A method for performing a wellbore operation using in-situ calibration of a logging tool deployed along a wellbore, the method comprising:
    extending the logging tool, coupled to a control center, into the wellbore;
    acquiring a first measurement signal of the formation using the logging tool;
    simulating, via the control center, a second measurement signal of the formation;
    calculating, via the control center, a calibration coefficient based on a comparison between the acquired first measurement signal and the simulated second measurement signal;
    acquiring, via the logging tool, a third measurement signal of the formation using the logging tool, wherein the first, second and third measurement signals correspond to the same transmitter-receiver pair of the logging tool; and
    while the logging tool is within the wellbore, calibrating the acquired third measurement signal using the calibration coefficient.

2. A method as defined in claim 1, wherein:
    the acquired first measurement signal, simulated second measurement signal, and acquired third measurement signal are all deep measurement signals; and
    the deep measurement signals are acquired using two antennas spaced at least 600 inches apart axially along the logging tool.

3. A method as defined in claim 1, wherein simulating the second measurement signal further comprises:
    acquiring a reference measurement signal of the formation using the logging tool;
    calculating layer resistivity data of the formation using the acquired reference measurement signal;
    selecting a set of calibration depths along the wellbore; and
    simulating the second measurement signal at the selected calibration depths using the layer resistivity data.

4. A method as defined in claim 3, wherein the reference measurement signal is a shallow measurement signal.

5. A method as defined in claim 3, wherein the first measurement signal is acquired at a depth which corresponds to at least one of the selected set of calibration depths.

6. A method as defined in claim 3, wherein:
    the reference measurement signal is acquired within a first calibration zone of the formation, the first calibration zone being a first range of wellbore depths;
    the first measurement signal is acquired within the first calibration zone;
    the second measurement signal is simulated within the first calibration zone; and
    the third measurement signal is acquired within an application zone located along a second range of wellbore depths different from the first calibration zone.

7. A method as defined in claim 3, wherein selecting the set of calibration depths further comprises:
    generating a log response of a plurality of acquired first measurement signals; and
    selecting those calibration depths which correspond to zero slopes along the log response.

8. A method as defined in claim 1, wherein the acquired first measurement signal is a low frequency signal comprising a frequency low enough such that the acquired first measurement signal is not affected by variations in the formation.

9. A method as defined in claim 8, wherein the acquired first and third measurement signals are deep measurement signals.

10. A method as defined in claim 8, wherein the simulated second measurement signal is substantially depth invariant.

11. A method as defined in claim 8, wherein:
    the first measurement signal is acquired within a first calibration zone of the formation, the first calibration zone being a first range of wellbore depths;
    the second measurement signal is simulated within the first calibration zone; and
    the third measurement signal is acquired within an application zone located along a second range of wellbore depths different from the first calibration zone.

12. A method as defined in claim 6, further comprising:
    acquiring a fourth measurement signal within a second calibration zone of the formation, the second calibration zone being a third range of wellbore depths different from the first calibration zone; and
    calibrating the acquired fourth measurement signal.

13. A method as defined in claim 1, wherein calculating the calibration coefficient further comprises utilizing a calibration model to calculate a plurality of calibration coefficients along a calibration zone of the formation, the calibration zone being a first range of wellbore depths, wherein the third measurement signal is acquired and calibrated within an application zone located along a second range of wellbore depths different from the calibration zone.

14. A method as defined in claim 1, wherein calculating the calibration coefficient further comprises utilizing a calibration model to calculate a plurality of calibration coefficients along a calibration zone of the formation, the calibration zone being a first range of wellbore depths, wherein the third measurement signal is acquired and calibrated within the calibration zone.

15. A method as defined in claim 13, wherein the calibration model is a polynomial function.

16. A method as defined in claim 15, wherein the calibration model is $F(X)=AX$, where A is a calibration coefficient.

17. A method as defined in claim 15, wherein the calibration model is $F(X)=AX+B$, where A and B are the calibration coefficients.

18. A method as defined in claim 13, wherein the calibration coefficients are calculated at depths that satisfy a criterion based on a rate of change in third measurement signal as a function of depth.

19. A method as defined in claim 18, wherein the criterion comprises selection of depths that have a rate of change below a threshold value.

20. A method as defined in claim 1, wherein the simulated second measurement signal is simulated using:
    parameters of the formation in which the logging tool is deployed;
    parameters of another formation in which the logging tool is not deployed; or
    a constant formation resistivity.

21. A method as defined in claim 1, further comprising transmitting the calibrated third measurement signal, via a telemetry sub disposed downhole, to a component at a remote location which is configured to receive the third measurement signal.

22. A method as defined in claim 1, wherein the logging tool forms part of a logging while drilling or wireline assembly.

23. A method as defined in claim 1, wherein calculating the calibration coefficient further comprises calculating the calibration coefficient at a low angle section of the wellbore, wherein the third measurement signal is acquired from a high angle section of the wellbore.

24. A system comprising processing circuitry to implement the method of claim 1.

25. A non-transitory computer-program product comprising instructions which, when executed by at least one processor, causes the processor to perform the method of claim 1.

* * * * *